(12) United States Patent
Verrilli (10) Patent No.: US 7,434,753 B2
(45) Date of Patent: Oct. 14, 2008

(54) SIMPLISTIC APPROACH TO DESIGN OF A REUSABLE NOZZLE HUB

(76) Inventor: Brian L. Verrilli, 7407 Brava St., Carlsbad, CA (US) 92009

( * ) Notice: Subject to any disclaimer, the term of this patent is extended or adjusted under 35 U.S.C. 154(b) by 998 days.

(21) Appl. No.: 10/713,681

(22) Filed: Nov. 14, 2003

(65) Prior Publication Data

US 2005/0103886 A1    May 19, 2005

(51) Int. Cl.
*B05B 1/14* (2006.01)
*F23D 14/68* (2006.01)
*A61M 5/32* (2006.01)

(52) U.S. Cl. .................. 239/590.3; 239/589; 239/602; 239/600; 604/198; 604/110; 604/218; 604/195

(58) Field of Classification Search ............. 239/589, 239/597, 590.3, 600, 602; 604/198, 110, 604/218, 195
See application file for complete search history.

(56) References Cited

U.S. PATENT DOCUMENTS

| 4,994,029 | A | * | 2/1991 | Rohrbough | .................. 604/88 |
| 5,341,993 | A | * | 8/1994 | Haber et al. | ................ 239/331 |
| 5,573,281 | A | * | 11/1996 | Keller | .......................... 285/40 |
| 6,610,042 | B2 | * | 8/2003 | Leon et al. | .................. 604/500 |
| 6,932,280 | B2 | * | 8/2005 | Crouch | .................... 239/288.5 |

* cited by examiner

*Primary Examiner*—Len Tran
*Assistant Examiner*—James S Hogan (57) ABSTRACT

A novel hub design that enables removal of nozzle core for disposal while the hub is retained for reuse. The reusable hub provides a cost advantage over a one-piece metal design, enabling the use of a dispensing system that is of high quality and low cost to proliferate the use of the technology in the industry. Using this method, a nozzle hub dispensing system has a very favorable impact on the environment, 90% less hazardous waste with a reusable hub system, as only the lightweight cores are disposed. This nozzle hub provides a positive locking, tool-less mechanical connection of nozzle core to hub, which offers a financial advantage over competitive products.

18 Claims, 7 Drawing Sheets

DETAIL C

Fig.3

SECTION A-A

DETAIL B

SIMPLISTIC APPROACH TO DESIGN OF A REUSABLE NOZZLE HUB

CROSS REFERENCE TO RELATED APPLICATIONS

Related application Ser. No. 09/828,621, Filed Apr. 6, 2001, Now Patent Pending. Related application Ser. No. 10/319,906, Filed Dec. 16, 2002, Now Patent Pending.

FEDERALLY FUNDED RESEARCH

Not Applicable

SEQUENCE LISTING OR PROGRAM

Not Applicable

BACKGROUND OF INVENTION

1. Field of the Invention

This invention pertains to the field of liquid dispensing equipment. More particularly, it pertains to a novel hub that facilitates mechanical connection of a nozzle. The hub provides a positive locking, tool-less connection to the nozzle core that is separable. Used cores can be removed from the hub, discarded and a new core inserted. The hub is retained and not consumed. Institution of this approach to nozzle design can realize a large gain in financial advantage over competitive products.

2. Description of the Prior Art

Needle or nozzle hubs are used to provide a positive connection of a nozzle to a source of fluid. A variety of different manufacturing processes are used in the industry to build the hub component, machining, casting, molding and insert molding are just a few examples. In every case the connection between the passage that fluid flows through in route to the exit aperture is joined, bonded, machined as one piece or otherwise designed to be an integral feature or permanent connection. The method of joining the hub to the fluid path and material selected are a function of the general type of nozzle.

At present there are three general types of nozzles used to underfill electronic devices with viscous liquid: (1) a modified hypodermic needle made of stainless steel and medical tubing, (2) a custom machined metal nozzle, and (3) a molded plastic cone-shaped nozzle. The modified hypodermic needle nozzle is merely a standard hypodermic needle adapted to fit to a standard valve (Luer or Luer lock type) and attached to a hose leading from a pump that is connected to a reservoir of liquid. Modified hypodermic needles have a constant diameter throughout the length. This causes a very high-pressure drop across the needle and restricts liquid flow. In addition, the needle is made from stainless steel, plastic, or brass. Stainless steel and plastic are not known as good heat transfer materials. The fluid path is not contiguous and usually constrictive at the connection point, hub and fluid path are permanently connected together. Transition points of the flow channel through the nozzle using this manufacturing technique are abrupt and inconsistent.

The custom machined nozzle may be made of better heat transfer materials and may be shaped to remove, or, at least, greatly reduce the resistance produced in the hypodermic needle design; however, a machined nozzle is limited to the size of the tools that can be used to cut the inside wall diameter and the wall thickness that must be maintained to ensure cuts are made without deformation of the nozzle. Machining of nozzles can be applied to one and two-piece designs, any shape can be made that can be programmed to cut using computer controlled lathes or form tools ground for the purpose. Whether the nozzle is constructed from multiple parts or machined as one with hub features integrated into the part, it is important to note, the hub cannot be separated or removed from the nozzle. It is difficult to make very small gage sizes, almost impossible if the nozzle wall is thin. These limitations, along with the high cost of machining minute nozzles of this type, have slowed the widespread use of such nozzles in the industry.

The molded plastic nozzle is the lowest cost nozzle produced. It can be made in a variety of sizes and shapes out of a number of engineering polymers, using plastic injection molding. Injection molding is a process that imposes limitations in wall thickness, due to the difficulty of forcing molten thermoplastic into the mold cavity. Plastics are not good agents of heat transfer, they are not dimensionally stable, require a relatively loose tolerance, expand and contract when exposed to high intermittent pressures and have a hub that is integral to the fluid path with threads that have little resistance to failure by over tightening. Such a practice has not been well accepted in the industry. The modified hypodermic needle remains the most widely used nozzle.

3. Objects and Advantages

Accordingly, the design of the contiguous nozzle core hub has inherent objects and advantages that were not described earlier in my patent. Several additional objects and advantages of the present invention are:

1.) To provide a design for a separable or removable hub to enable contiguous nozzle cores to be held in place and positively locked onto the output port of a pump or source of fluid.

2.) To provide a design for a nozzle or needle hub that increases the structural rigidity of a nozzle core by increasing resistance to hoop stress due to pressure. Hoop stress is a result of force from internal pressure acting on the interior surface area of the nozzle core. As stress in the core wall builds from increasing pressure, a unit strain or deflection in the hoop or circumferential direction is experienced at the core wall.

3.) To provide a design for a nozzle or needle hub that allows the core to be removed and inserted into the hub with ease, in a manner that requires no tools to accomplish.

4.) To provide a design for a nozzle or needle hub that can be produced, using thermally efficient, conductive metals, copper and copper alloys are the best candidates for the process.

5.) To provide a design that enables production of a nozzle or needle hub, wherein the design lowers cost by virtue of reduction in the number of secondary operations required to produce a saleable nozzle or needle dispensing system that is high quality and low cost to proliferate the use of the technology in the industry.

6.) To provide a design, wherein hub material and volume are selected to provide a thermal reservoir. Changes in material, volume and the heated area affect thermal energy storage rates. The speed of thermal energy dissipation into the actual nozzle is a function of the contact area and resistance caused by the gas layer between the parts in conductive heat transfer. Thermal energy transfer into the hub for a given thermal cycle can be demonstrated by Adam's model for 3 dimensional heat transfer.

7.) To provide a design for a nozzle/needle hub that contains the link for mechanical connection of a heating device.

8.) To provide a design for a nozzle/needle hub with a Standard Luer-Lok thread and 360° of engagement that reduces device damage from thread failure and process interruption from tip loosening.

9.) To provide a Universal Hex design hub for a needle/nozzle that can use standard or metric tools for removal: 8 mm metric or 5/16 standard.

10.) To provide a nozzle system that effectively reduces the amount of hazardous waste that results from dispensing related operations in the industry by 90%.

11.) To provide a tool-less method of core removal from the connection.

SUMMARY OF THE INVENTION

The invention is a novel design of such a reusable hub for securing and removing a disposable core made to fit to a standard valve (Luer or Luer lock type) and attached to a hose leading from a pump that is connected to a reservoir of liquid. A nozzle hub comprises: A cylindrically-shaped wall extending downward to an exterior groove, then outward to a break point defined by a hexagonal shape spaced apart from said exterior groove, downward there-from along the faces to an adjacent fund-us which has a hexagonal perimeter; an interior cylindrically-shaped barrel wall made with a slight inward slant or cast and extends downward from the upper surface to said fund-us; a groove with a ledge defined by a vertical perimeter and a flare extending inward from said perimeter; the top side of the groove is used to pull the seated nozzle core from the Luer or Luer lock type taper; a longitudinal slot descending along the hub set inward at an acute angle; a horizontal furrow intersecting said groove and spaced tangent to said ledge defined by a vertical perimeter and a flare extending inward from the perimeter. Wherein there is a controlled ratio of the diameter of said interior cylindrically shaped barrel wall made with a slight inward slant or cast measured at any elevation between the tangency point at the intersection of the flare extending inward from the perimeter and the fund-us and the width of said longitudinal slot descending along said hub set inward at an acute angle measured at an identical elevation of greater than 0.5. The nozzle hub for securing a nozzle core, wherein a longitudinal slot extending downward along said hub, a nozzle core is compressed through the slot, sliding along a horizontal furrow intersecting a groove and spaced tangent to a ledge defined by a vertical perimeter, expanding to locate the nozzle core on the flare extending inward from said perimeter. Currently, two designs exist for the hub. The concept behind each design is different, according to the sensitivity of the dispensing process to the thermal response rate. Initially, hubs were brazed to the core enabling fast heat transfer from the hub to the core. This design trades increased cost for superior advantage in thermal response rate. Accordingly, the main object of this invention is a novel nozzle hub that can be removed from the nozzle core and reused, reducing cost to the consumer by allowing replacement of the contiguous core held by the hub. The hub is retained to use for holding the next core. The hub can be made from any material but those made for use in a heated application contain a high percentage of copper. The nozzle hub permits disposal of nozzle core alone, reducing waste and allows the nozzles to be made more economically and more useful in the relevant industry.

These and other objects of the invention will become clearer when one reads the following specification, taken together with the drawings that are attached hereto. The scope of protection sought by the inventor may be gleaned from a fair reading of the claims that conclude this specification.

DESCRIPTION OF THE DRAWINGS—FIGURES

Turning now to the drawings wherein elements are identified by numbers and like elements are identified by like numbers throughout the seven figures, the novel design of a reusable nozzle hub 1 is depicted in FIGS. 1-4.

DESCRIPTION OF THE PREFERRED EMBODIMENT

Figure 5:
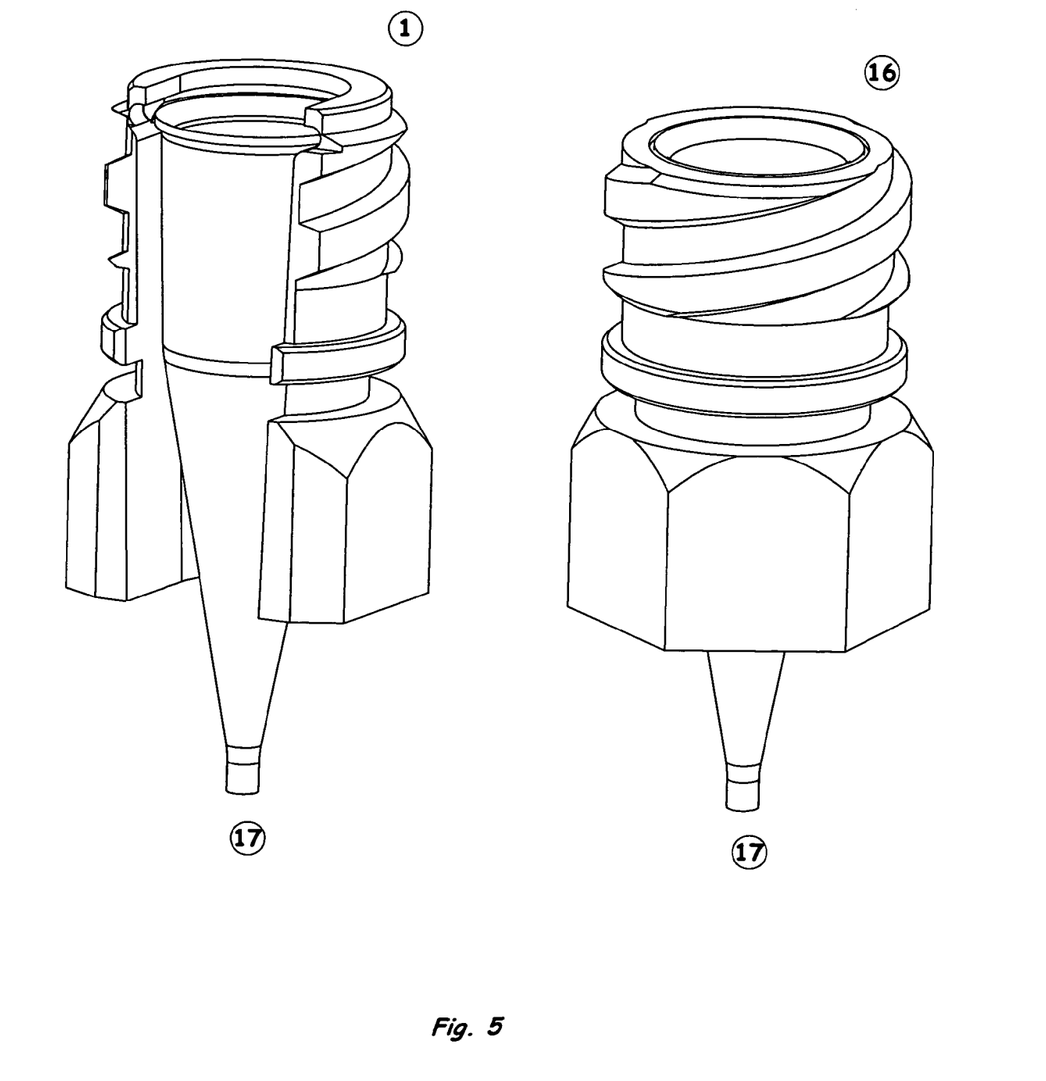
FIG. 5 shows the nozzle hub 16 used when a permanent brazed connection is desired next to the novel reusable hub 1.
Figure 6:
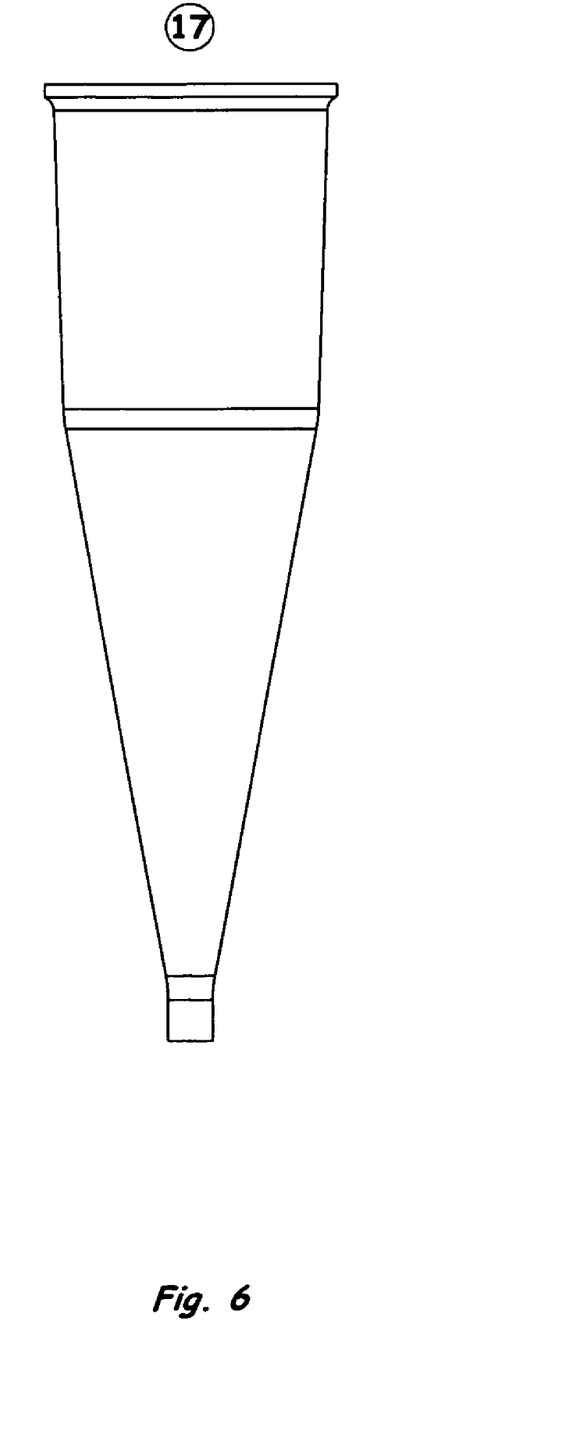
FIG. 6 is a front view of the nozzle core 17 that fits the brazed hub 16 or the reusable hub 1.

Referring now to the drawings wherein the showings are for the purpose of illustrating Preferred embodiments of the invention only and not for the purpose of limiting it. The invention is a novel design for a nozzle hub 1 depicted in FIG. 1 that enables removal of the nozzle core 17 shown in FIG. 6 for replacement. It is preferred that the hub 1 be made in one, monolithic unit that surrounds, supports and secures the nozzle core 17 to increase the resistance of the core 17 to deformation or strain that occurs due to force from pressure acting on the interior surface area. A flared wall 12 locates the core 17 in relation to the Lure threaded hub for both reusable mechanical hub and brazed hub connection assemblies. FIG. 5 is a side-by-side illustration of the hub 16 brazed hub to the nozzle core 17 and the nozzle core 17 installed in the reusable hub 1. The concept behind each design is different, according to the sensitivity of the dispensing process to the thermal response rate. In the first nozzle hub design 16, the hub 16 is brazed to the nozzle core 17 enabling fast heat transfer from the hub 16 to the core 17. This design trades increased cost for superior advantage in thermal response rate. The second design separates nozzle core 17 from nozzle hub 1 reducing cost to the customer by allowing replacement of the contiguous core 17 held by the hub 1. The hub 1 is retained to use for holding the next core 17. This design trades the advantage in thermal response rate to gain an advantage in cost.

Figure 1:
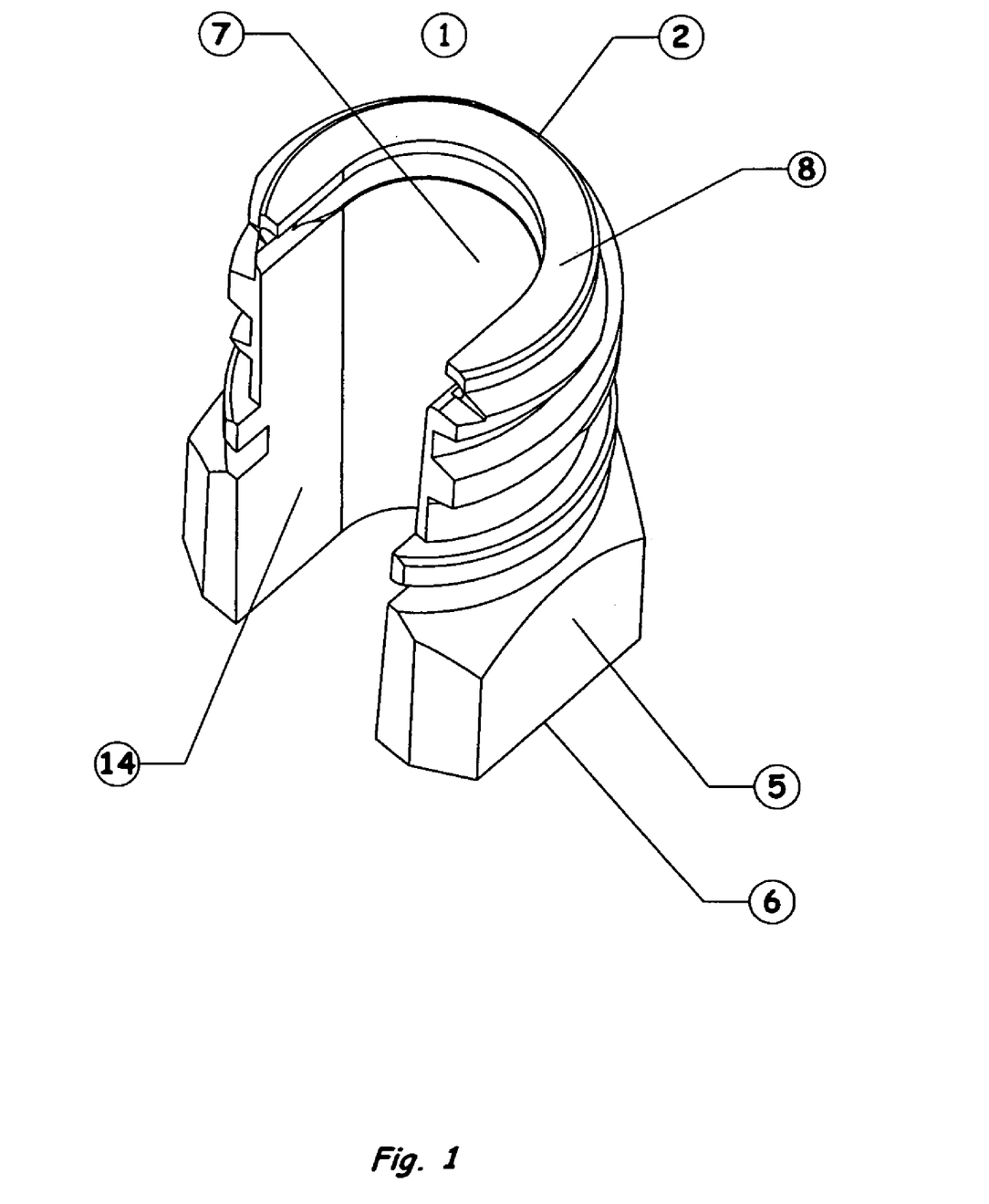
FIG. 1 is an illustrative view of the invention from an elevated vantage point.
Figure 2:
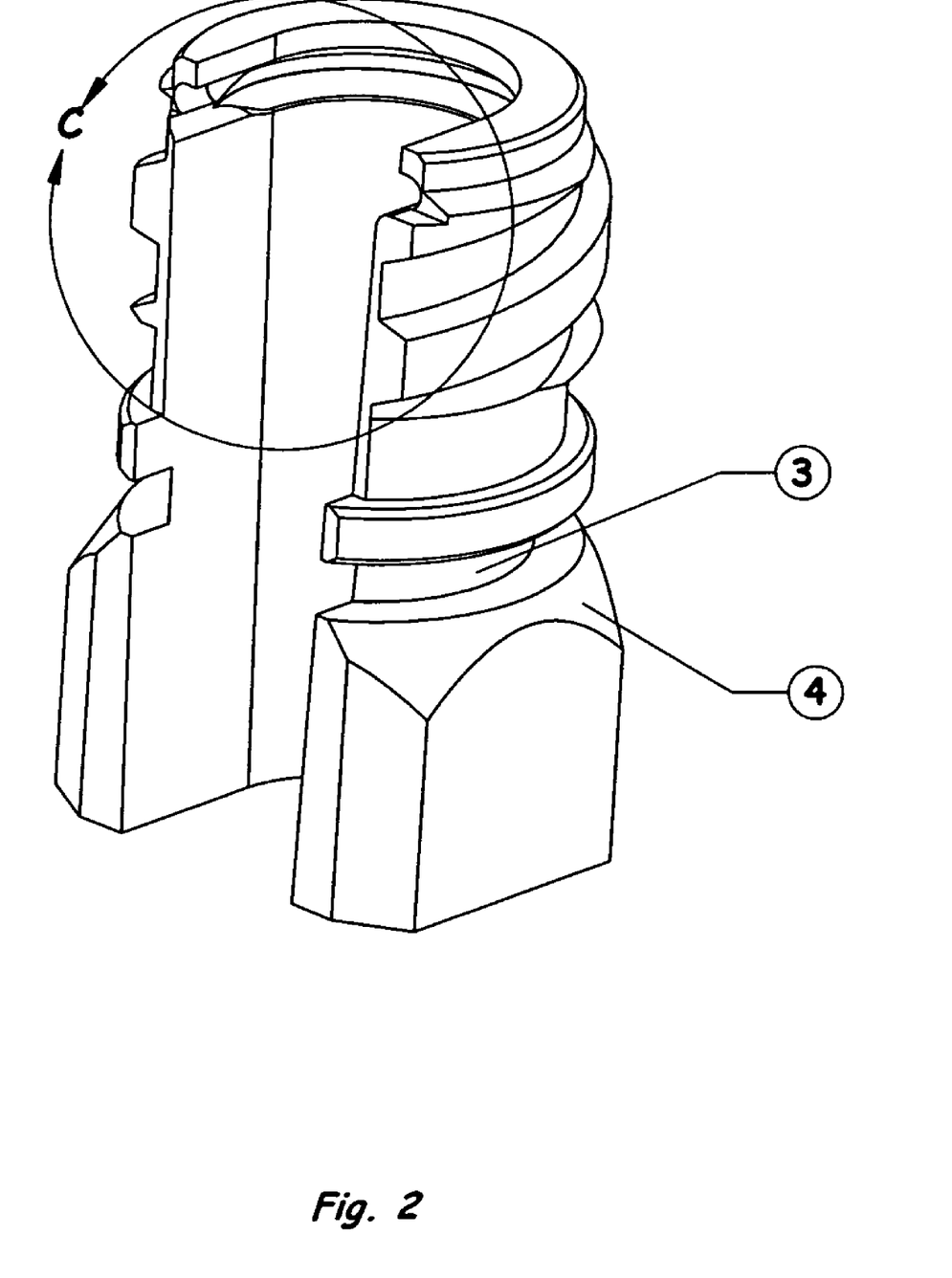
FIG. 2 is an illustrative eye level view of the invention.
Figure 3:
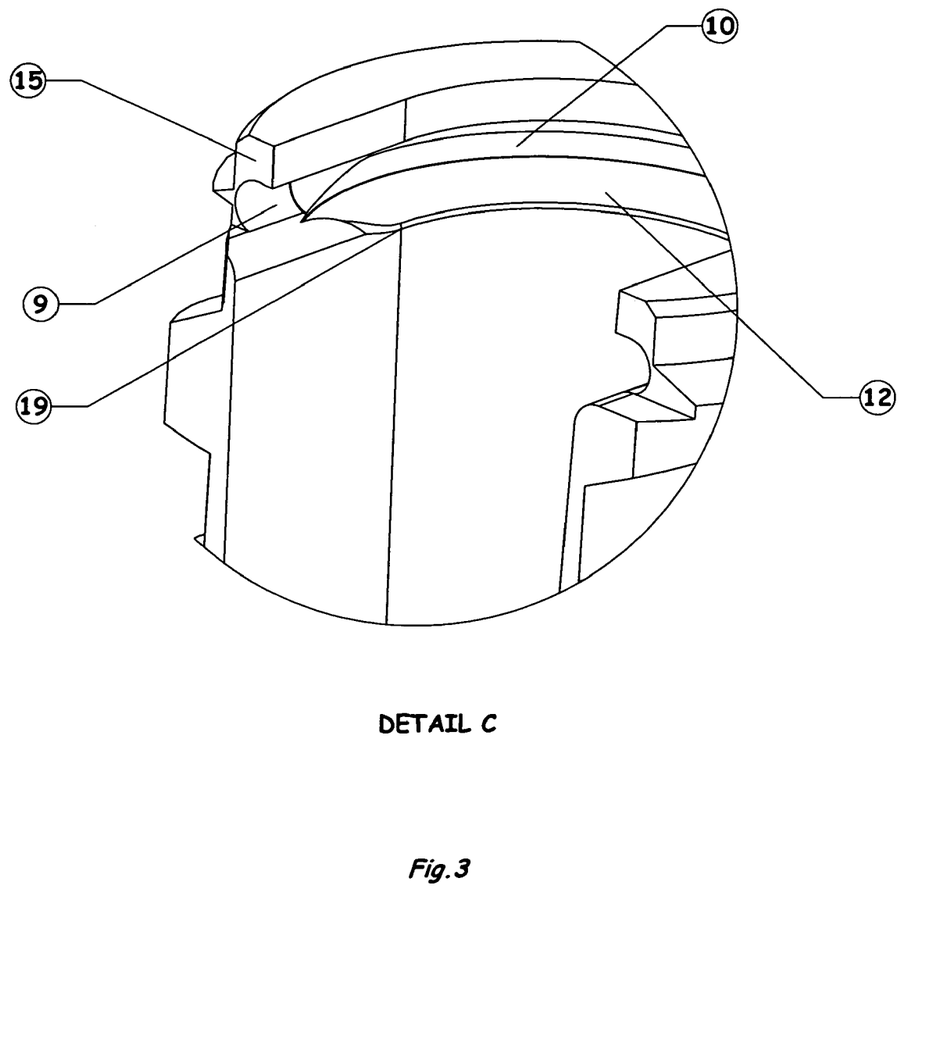
FIG. 3 is an illustrative close up view of a detail shown in FIGS. 1 and 2.
Figure 4:
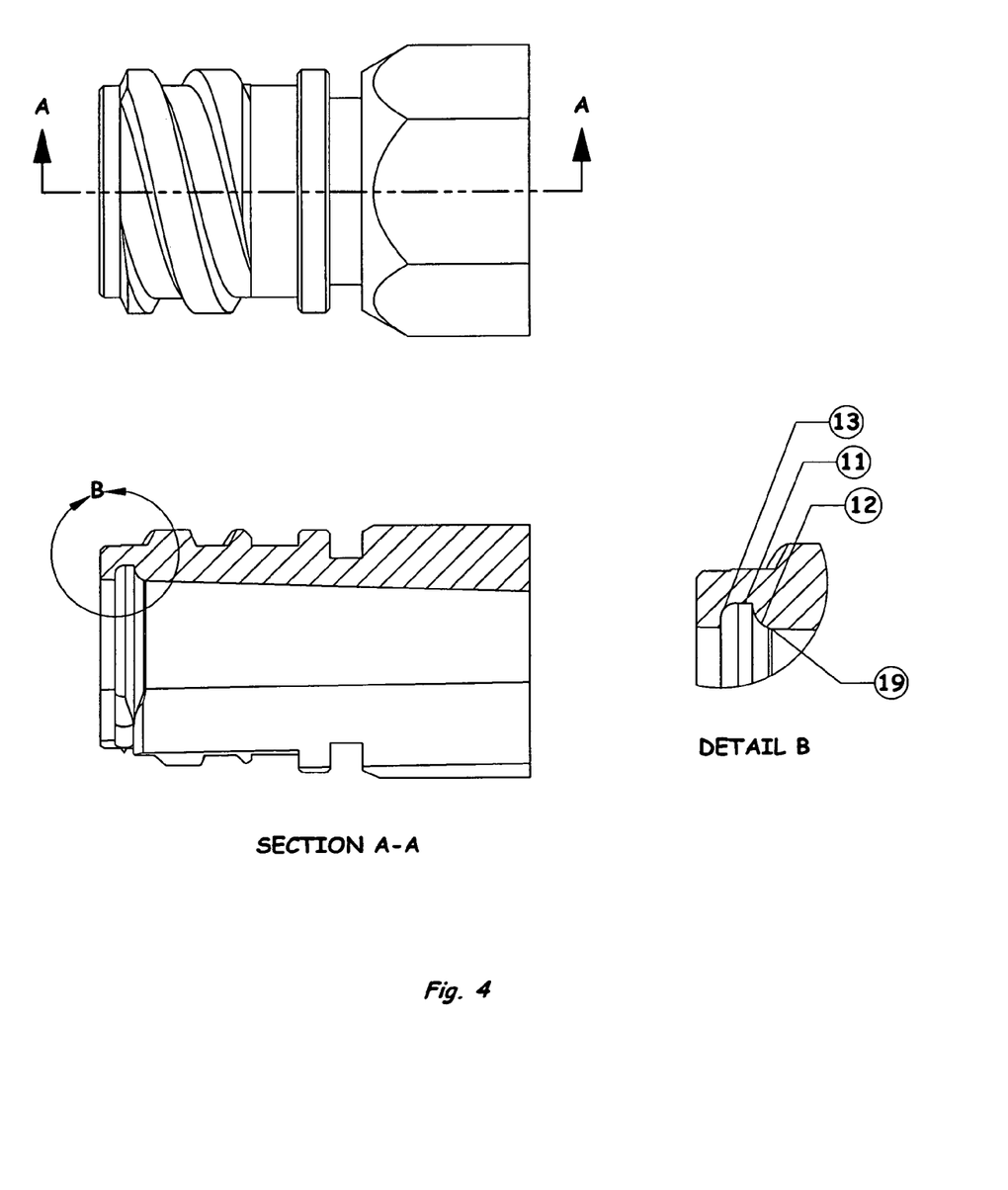
FIG. 4 is an illustrative section view of the interior groove 10 with a ledge 11 of the nozzle hub 1.
Figure 7:
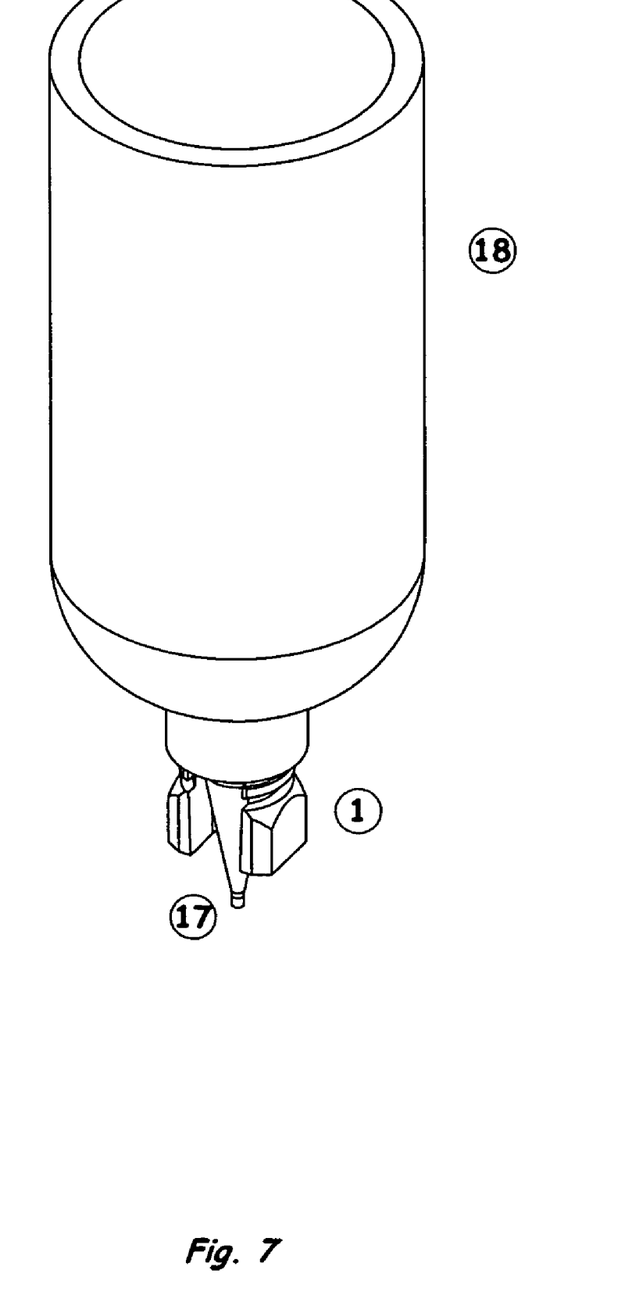
FIG. 7 is an illustrative view from an elevated vantage point of the reusable hub 1 and nozzle core 17 connected to a reservoir 18.

The inventive nozzle hub 1 is depicted in FIGS. 1-3, in vertical or near vertical attitude and in FIG. 4 in horizontal attitude and comprises a exterior cylindrically shaped barrel wall 2 extending downward about 7 to 8 millimeters to an exterior groove 3 that spans 1 millimeter then outward to a break point defined by a hexagonal shaped barrel wall 2 extending downward to an exterior groove 3 then outward to a break point defined by a hexagonal shape spaced apart from the groove 3 at about 30 degrees 4. The purpose of the groove 3 is to aid in installation of a device that applies heat to the fund-us 6. An exterior cylindrically shaped barrel wall 2 performs the function of securing the nozzle hub 1 and nozzle core 17 to a reservoir 18 from which a viscous fluid is transferable, FIG. 7.

Extending downward there-from along the faces 5 to an adjacent fund-us with a hexagonal perimeter 6 is about 4 to 6 millimeters. Faces 5 of the hexagonal shape measure between 5 and 25 millimeters and more preferably about 8-12 millimeters between parallel faces 5 facilitate use of a wrench for application of torque to the hub for installation and removal and increase surface area for convective transfer of thermal energy.

An interior cylindrically shaped barrel wall 7 is made with a slight inward cast or slant such as between 1 and 5 degrees and more preferably between 2 and 4 degrees from upper surface 8 to a fund-us 6. It is further preferred that the interior cylindrically shaped barrel wall be made circular and limited to about 25 millimeters in diameter. This helps to support and align the nozzle core 17 to form a leak proof connection to the Luer taper. A groove 10 with a ledge 11 and a flare 12 extending inward from the perimeter 13 is intersected by a horizontal furrow 9 that is about 0.5 to 0.75 millimeters across and about 1 or 2 millimeters from the top circular surface 8. The horizontal furrow 9 originates from a flat surface 15 recessed below the cylindrically shaped wall 2 extending upward to the top circular surface 8.

The longitudinal slot 14 extends downward along the hub 1 set inward at an acute angle is parallel to the interior cylindrically shaped barrel wall 7 and has a wall convergence between about 6 to 8 degrees included. The ratio of the diameter of the interior cylindrical shaped barrel wall 7 measured at any elevation between the tangency point at the intersection of the flare extending inward from the perimeter 19 and the fund-us 6 to the width of the longitudinal slot 14 descending along the hub 1 set inward at an acute angle measured at an identical elevation exceeds 0.5. The longitudinal slot 14 extends downward along the hub 1; the nozzle core is compressed moving through the slot 14, sliding along the horizontal furrow 9 intersecting the groove 10, spaced tangent to the ledge 11 defined by the vertical perimeter 10, expanding to locate the nozzle core on the flare 12, extending inward from the vertical perimeter 13.

In the preferred embodiment of the invention, for applications that require a heated fluid path, it is preferred that nozzle hub 1 be made from a thermally conductive material, such as copper. More particularly, it is preferred that thermally conductive material, such as copper comprises at least 90% by weight of metal for the best thermal response. Nozzle hubs 1 used in applications where heat is not necessary can be made of any material that can be machined or molded.

While the invention has been described with reference to a particular embodiment thereof, those skilled in the art will be able to make various modifications to the described embodiment of the invention without departing from the true spirit and scope thereof. It is intended that all combinations of elements and steps, which perform substantially the same function in substantially the same way to achieve substantially the same result, be within the scope of this invention.

What is claimed is:

1. A nozzle hub for securing a nozzle core comprising:
   a) a cylindrically shaped wall extending downward to an exterior groove, then outward to a break point defined by a hexagonal shape spaced apart from said exterior groove, downward there-from along the faces to an adjacent fund-us which has a hexagonal perimeter;
   b) a interior cylindrically shaped barrel wall made with a slight inward slant or cast and extends downward from the upper surface to said fund-us;
   c) a groove with a ledge defined by a vertical perimeter and a flare extending inward from said perimeter;
   d) a longitudinal slot descending along said hub set inward at an acute angle;
   e) a horizontal furrow intersecting said groove and spaced tangent to said ledge defined by said vertical perimeter and said flare extending inward from said perimeter;
   f) wherein there is a controlled ratio of diameter of said interior cylindrically shaped barrel wall made with a slight inward slant or cast measured at any elevation between tangency point at intersection of said flare extending inward from said perimeter and said fund-us to width of said longitudinal slot descending along said hub set inward at an acute angle measured at an identical elevation.

2. The nozzle hub for securing a nozzle core of claim 1, wherein said cylindrically shaped barrel wall is made with a slight inward slant or cast and extends downward from said flare wall at an angle between 1 and 5 degrees and more preferable about 2-4 degrees which helps to support and align the nozzle core.

3. The nozzle hub for securing a nozzle core of claim 1, wherein said nozzle hub can be removed, separated from said nozzle core and reused for securing said nozzle core again.

4. The nozzle hub for securing a nozzle core of claim 1, wherein said barrel wall of said nozzle hub secures said nozzle core to a reservoir from which a viscous liquid is transferable.

5. The nozzle hub for securing a nozzle core of claim 1, wherein said exterior groove is a means for connection of said barrel wall of said nozzle hub through an adjacent fund-us which has a hexagonal perimeter shape to a source of heat.

6. The nozzle hub for securing a nozzle core of claim 1, wherein said longitudinal slot extending downward along said hub, said nozzle core is compressed through said slot, sliding along said horizontal furrow, intersecting said groove and spaced tangent to said ledge defined by said vertical perimeter, expanding to locate said nozzle core on said flare extending inward from said perimeter.

7. The nozzle hub for securing a nozzle core of claim 1, wherein said break point defined by a hexagonal shape spaced apart from said exterior groove at an angle of about 30 degrees with the vertical.

8. The nozzle hub for securing a nozzle core of claim 1, wherein said break point that is hexagonal in shape, and measures between 5 and 25 millimeters and more preferable about 8-12 millimeters between parallel said faces.

9. The nozzle hub for securing a nozzle core of claim 1, wherein said cylindrically shaped wall extending downward to said exterior groove is about 7 to 8millimeters.

10. The nozzle hub for securing a nozzle core of claim 1, wherein said exterior groove is about one millimeter wide.

11. The nozzle hub for securing a nozzle core of claim 1, wherein said groove with a ledge defined by said vertical perimeter and said flare extending inward from said perimeter is about one or two millimeters from the top circular surface.

12. The nozzle hub for securing a nozzle core of claim 1, wherein said longitudinal slot descending along said hub set inward at an acute angle has a wall convergence between about 6 to 8 degrees included.

13. The nozzle hub for securing a nozzle core of claim 1, wherein said horizontal furrow intersecting said groove and spaced tangent to said ledge is about 0.5to 0.75 millimeters across.

14. The nozzle hub for securing a nozzle core of claim 1, said exterior groove, downward there-from along the faces to an adjacent fund-us is about 4 to 8 millimeters.

15. The nozzle hub for securing a nozzle core of claim 1, wherein there is a controlled ratio of said diameter of said interior cylindrically shaped barrel wall made with a slight inward slant or cast measured at any elevation between tangency point at intersection of said flare extending inward from said perimeter and said fund-us to width of said longitudinal slot, descending along said hub set inward at an acute angle, measured at an identical elevation, exceeds 0.5.

16. The nozzle hub for securing a nozzle core of claim 1, wherein said longitudinal slot descending along said hub set inward at an acute angle is parallel to said interior cylindrically shaped barrel wall made with a slight inward slant or cast.

17. The nozzle hub for securing a nozzle core of claim 1, wherein said interior cylindrically shaped barrel wall with a slight outward cast or slant, extending upward from said groove to a circle lying in a plane parallel to the plane of said fund-us is about 25 millimeters in diameter.

18. The nozzle hub for securing a nozzle core of claim 1, wherein said horizontal furrow originates from a flat surface recessed below said cylindrically shaped wall, extending upward to said top circular surface.

* * * * *